May 18, 1965 TIMOTHY TUNG JEN YOUNG Re. 25,783
DRIVE MECHANISM FOR A BICYCLE OR THE LIKE
Original Filed April 30, 1962
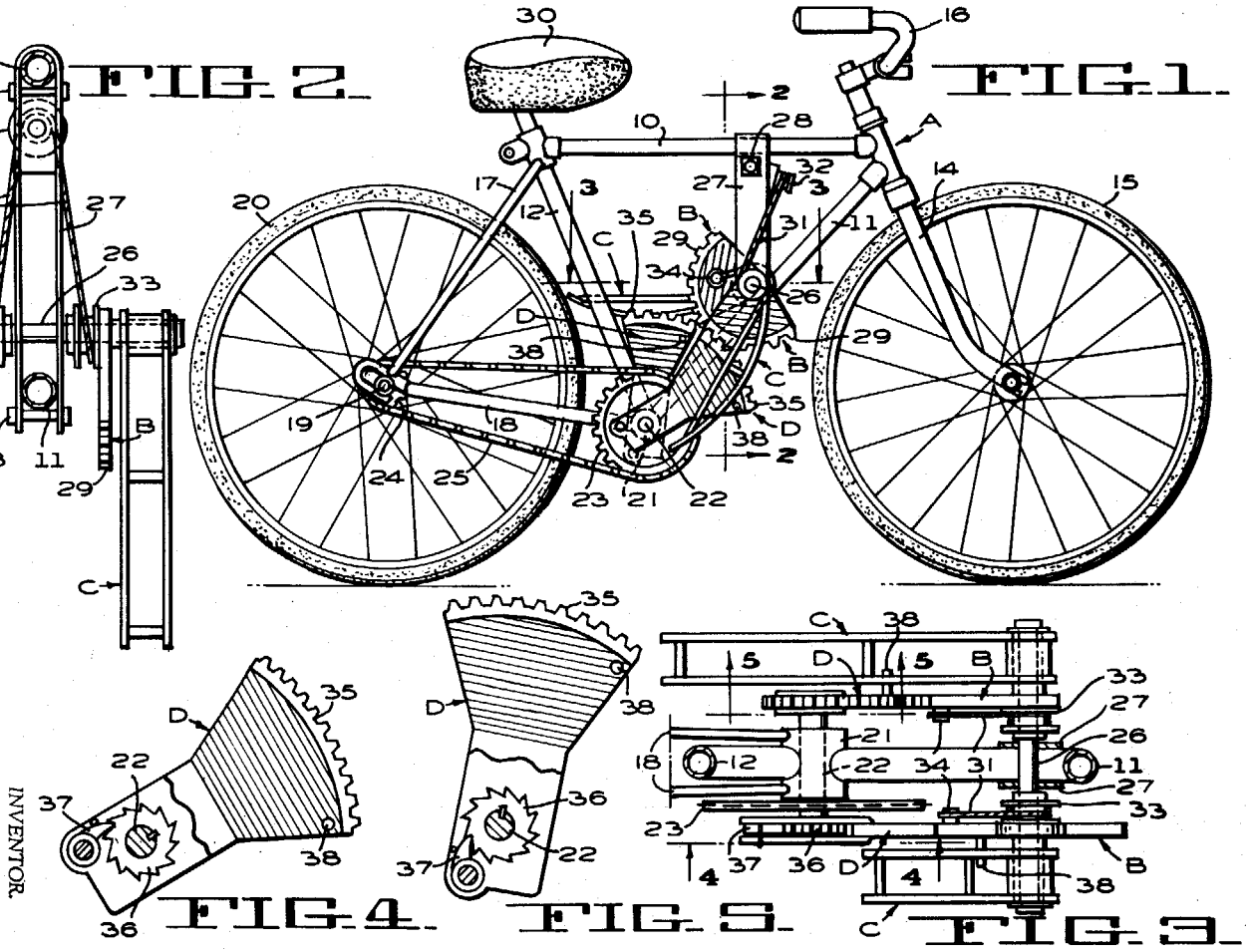
INVENTOR.
TUNG JEN YOUNG
NOW BY JUDICIAL CHANGE OF
NAME TO
TIMOTHY TUNG JEN YOUNG
BY Joseph F. Cole, ATTORNEY United States Patent Office Re. 25,783

Reissued May 18, 1965

25,783
DRIVE MECHANISM FOR A BICYCLE OR THE LIKE

Timothy Tung Jen Young, 1211 Olive St., San Carlos, Calif.

Original No. 3,083,985, dated Apr. 2, 1963, Ser. No. 191,172, Apr. 30, 1962. Application for reissue May 18, 1964, Ser. No. 380,725

3 Claims. (Cl. 280—258)

Matter enclosed in heavy brackets [ ] appears in the original patent but forms no part of this reissue specification; matter printed in italics indicates the additions made by reissue.

The present application is *a reissue of Patent No. 3,083,985 that is* a continuation-in-part of my copending application, Serial No. 115,698, which was filed in the United States Patent Office on June 8, 1961, now abandoned.

In the conventional crank device for a bicycle, or the like, the crank drive must be moved through complete rotations; however, the cyclist is able to impart an effective driving thrust to each pedal only during the initial downward movement of the pedal, and at this time the knee of the cyclist is bent with the resultant reduction of force delivered to the pedal. As each pedal ascends, no driving thrust is imparted to such a pedal, and the cyclist must stretch the legs all the way back, and without any effective work being done in the angular displacement of the ascending pedal.

Thus, there is only an intermittent effective drive, even though the cyclist pedals continuously, and there is considerable loss of effort.

As the cardinal object of this invention, it is proposed to provide a drive mechanism for a bicycle, or the like, which will be more efficient than the conventional crank drive, and whereby the cyclist can deliver effective thrust in a substantially continuous path during each power stroke imparted by the cyclist. The drive mechanism has identical units disposed on each side of the supporting frame of the bicycle, or the like, and as one unit is depressed the other unit is elevated and vice versa. Each of these drive units is provided with a foot rest that is adapted to be pressed down by the cyclist, with the power stroke of one unit following the power stroke of the other unit in succession, delivering a continuous propelling force to the bicycle, or the like.

Another object of this invention is to provide a drive mechanism in the form of an attachment, which may be readily attached to a conventional bicycle, or the like, without requiring any change in the latter, with the possible exception of removing the crank arms.

Other objects and advantages will appear as the specification continues. The novel features of the invention will be particularly set forth in the appended claims.

DRAWING

For a better understanding of the invention, reference should be had to the accompanying drawing, forming part of this specification, in which:

FIGURE 1 is a side elevational view of a bicycle equipped with my improved drive mechanism, and looking at the right side of the bicycle;

FIGURES 2 and 3 are enlarged sectional views taken along the vertical and hoizontal planes 2—2 and 3—3, respectively, of FIGURE 1;

FIGURES 4 and 5 are vertical sectional views taken along the longitudinal planes 4—4 and 5—5, respectively, of FIGURE 3, and showing a driven lever and associated parts on the right and left sides, respectively, of the bicycle.

While I have shown only the preferred form of my invention, it should be understood that various changes, or modifications, may be made within the scope of the annexed claims, without departing from the spirit thereof.

DETAILED DESCRIPTION

Referring now to the drawing in detail, I have disclosed a conventional bicycle having a supporting frame A having an upper tube 10, a lower front tube 11 that is inclined relative to the horizontal, and a rear upwardly extending tube 12. Moreover, the supporting frame has a front fork 14 journalled therein and this fork is provided with a front wheel 15 which may be steered by handle bars 16. Upper and lower rear forks 17 and 18, respectively, of the supporting frame A has an axle 19 mounted thereon for a rear wheel 20.

As shown in FIGURE 1, the tubes 11 and 12 and the fork 18 provide a support for a transverse bearing tube 21. It will be apparent from both FIGURES 1 and 3 that a drive shaft 22 is journalled in this bearing tube and has a drive sprocket 23 fixed thereto. The ground-engaging rear wheel 20 is provided with a driven sprocket 24 on its axle 19, and a chain 25 is trained over the drive and driven sprockets 23 and 24, respectively so that rotation of the drive sprocket will actuate the driven sprocket to propel the bicycle, or the like.

The parts thus far described are conventional, and now I shall set forth my improved drive mechanism in detail. It will be seen from FIGURES 1 and 3 that an attachment shaft 26 is mounted on the supporting frame A to extend transversely thereof. For the purpose of mounting the shaft 26, I have secured a bracket 27 to the upper tube 10 and the lower front tube 11 by clamping bolts 28 (see FIGURE 2).

A pair of drive levers B are swingably disposed on the transverse attachment shaft 26 (see FIGURES 1 to 3, inclusive), one on the right side of the supporting frame A and the other on the left side thereof, and each drive lever is formed with a segmental gear 29. Moreover, I provide a pair of foot rests C, one being disposed on each side of the supporting frame A, and each foot rest C is secured to an adjacent drive lever B, whereby each foot rest may be depressed to impart a corresponding swinging movement to its respective drive lever. These foot rests may be actuated by a cyclist riding on a seat 30.

In order to interconnect the drive levers B so that when one is depressed the other will be elevated and vice versa, I have provided a cable 31. The intermediate portion of this cable is trained over a pulley 32 which is mounted on the bracket 27 for turning movement. The end sections of the cable 31 pass around a pair of pulleys 33 that are mounted on the transverse attachment shaft 26, with the outer ends of the cable being anchored by studs 34, or the like, to the drive levers B. The arrangement is such that when one foot rest C is depressed, the other foot rest will be raised by the cable.

It will be observed that a pair of driven levers D are mounted on the drive shaft 22 of the bearing tube 21, one on the right side of the supporting frame A and the other on the left side thereof. These driven levers are journalled for turning relative to the drive shaft 22, and each has a segmental gear 35 meshing with the segmental gear 29 of the drive lever B on the same side of the supporting frame A. Thus the driven levers D may be swung by the drive levers B.

As clearly illustrated in FIGURES 4 and 5, a pair of ratchet wheels 36 are fixed to the drive shaft 22 of the bearing tube 21, one on each side of the supporting frame A, with the ratchet wheels being disposed adjacent to the driven levers. A pair of spring-pressed pawls 37 are provided, each being carried by one of the driven levers D and operatively engaging with an adjacent ratchet wheel 36 to turn the drive shaft 22 and thereby propel the bicycle, or the like, through the instrumentality of the sprockets 23 and 24 and the chain 25, when the driven levers are swung in a clockwise direction in FIGURE 1 by the drive levers.

The transverse attachement shaft 26 and the drive levers B are arranged at an elevation above and in front of the drive shaft 22 of the bearing tube 21, with the foot rests C extending rearwardly from the transverse attachment shaft 26. This arrangement will be found convenient for the cyclist in operating the foot rests. The latter may be readily depressed by the cyclist in an efficient manner with the heel or ball, or both, of the feet. Each foot rest may be swung downwardly from the raised position, as shown on the left side of the supporting frame A in FIGURE 1, into the depressed position illustrated by the foot rest on the right side of the supporting frame in the same view. Each foot rest may be depressed in a continuous path, with force being applied thereto by the cyclist during the entire downward stroke of the foot rest being depressed by the cyclist.

In FIGURES 1, 3, 4 and 5, I show a stop 38 on each of the driven levers D that projects into the path of the adjacent foot rest C to limit downward swinging movement of the latter.

It will be apperciated, of course, that the radii of the segmental gears 29 and 35 may be changed to give different speeds and power or driving ratios that may be desired. Also, by using elliptical lobes on these segmental gears advantage may be gained in acceleration. When such acceleration is gained, greater angular displacement is gained by shorter angular linear distance.

I claim:

1. The combination with a bicycle, or the like, having a supporting frame provided with a transverse bearing tube, a drive shaft journalled in this bearing tube and having a drive sprocket fixed thereto, a ground-engaging wheel provided with a driven sprocket, and a chain trained over the drive and driven sprockets so that rotation of the drive [sprockets] *sprocket* will actuate the driven sprocket to propel the bicycle, or the like, of a drive mechanism comprising:

(a) an attachment shaft mounted on the supporting frame to extend transversely thereof;

(b) a pair of drive levers swingably disposed on the transverse attachment shaft, one on the right side of the supporting frame and the other on the left side thereof, and each drive lever being formed with a segmental gear;

(c) a pair of foot rests, one being disposed on each side of the supporting frame, and each foot rest being secured to an adjacent drive lever, whereby each foot rest may be depressed to impart a corresponding swinging movement to its respective drive lever;

(d) means interconnecting the drive levers so that when one is depressed the other will be elevated and vice versa;

(e) a pair of driven levers mounted on the drive shaft of the bearing tube, one on the right side of the supporting frame and the other on the left side thereof, and these driven levers being journalled for turning relative to the drive shaft of the bearing tube;

(f) each driven lever having a segmental gear meshing with the segmental gear of the drive lever on the same side of the supporting frame, whereby the driven levers may be swung by the drive levers;

(g) a pair of ratchet wheels fixed to the drive shaft of the bearing tube, one on each side of the supporting frame, with the ratchet wheels being disposed adjacent to the driven levers;

(h) and a pair of spring-pressed pawls, each being carried by one of the driven levers and operatively engaging with an adjacent ratchet wheel to turn the drive shaft of the bearing tube and thereby propel the bicycle, or the like, through the instrumentality of the sprockets and chain, when the driven levers are swung in one direction by the drive levers;

(i) the transverse attachment shaft and the drive levers being arranged [at an elevation above and] in front of the drive shaft of the bearing tube, with the foot rests extending rearwardly from the transverse attachment shaft.

2. The combination with a bicycle, or the like, having a supporting frame provided with a transverse bearing tube, a drive shaft journalled in this bearing tube and having a drive sprocket fixed thereto, a ground-engaging wheel provided with a driven sprocket, and a chain trained over the drive and driven sprockets so that rotation of the drive sprocket will actuate the driven sprocket to propel the bicycle, or the like, of a drive mechanism comprising:

(a) an attachment shaft mounted on the supporting frame to extend transversely thereof;

(b) a pair of drive levers swingably disposed on the transverse attachment shaft, one on the right side of the supporting frame and the other on the left side thereof, and each drive lever being formed with a segmental gear;

(c) a pair of foot rests, one being disposed on each side of the supporting frame, and each foot rest being secured to an adjacent drive lever, whereby each foot rest may be depressed to impart a corresponding swinging movement to its respective drive lever;

(d) means interconnecting the drive levers so that when one is depressed the other will be elevated and vice versa;

(e) a pair of driven levers mounted on the drive shaft of the bearing tube, one on the right side of the supporting frame and the other on the left side thereof, and these driven levers being journalled for turning relative to the drive shaft of the bearing tube;

(f) each driven lever having a segmental gear meshing with the segmental gear of the drive lever on the same side of the supporting frame, whereby the driven levers may be swung by the drive levers;

(g) a pair of ratchet wheels fixed to the drive shaft of the bearing tube, one on each side of the supporting frame, with the ratchet wheels being disposed adjacent to the driven levers;

(h) a pair of spring-pressed pawls, each being carried by one of the driven levers and operatively engaging with an adjacent ratchet wheel to turn the drive shaft of the bearing tube and thereby propel the bicycle, or the like, through the instrumentality of the sprockets and chain, when the driven levers are swung in one direction by the drive levers;

(i) and a bracket secured to [upper and lower tubes] *at least one tube* of the supporting frame;

(j) the transverse attachment shaft being mounted on this bracket for support thereby.

3. The combination with a bicycle, or the like, having a supporting frame provided with a transverse bearing tube, a drive shaft journalled in this bearing tube and having a drive sprocket fixed thereto, a ground-engaging wheel provided with a driven sprocket, and a chain trained over the drive and driven sprockets so that rotation of the drive sprockets will actuate the driven sprocket to propel the bicycle, or the like, of a drive mechanism comprising:

(a) an attachment shaft mounted on the supporting frame to extend transversely thereof;

(b) a pair of drive levers swingably disposed on the transverse attachment shaft, one on the right side of the supporting frame and the other on the left side thereof, and each drive lever being formed with a segmental gear;

(c) a pair of foot rests, one being disposed on each side of the supporting frame, and each foot rest being secured to an adjacent drive lever, whereby each foot rest may be depressed to impart a corresponding swinging movement to its respective drive lever;

(d) means interconnecting the drive levers so that when one is depressed the other will be elevated and vice versa;

(e) a pair of driven levers mounted on the drive shaft of the bearing tube, one on the right side of the supporting frame and the other on the left side thereof, and these driven levers being journalled for turning relative to the drive shaft of the bearing tube;

(f) each driven lever having a segmental gear meshing with the segmental gear of the drive lever on the same side of the supporting frame, whereby the driven levers may be swung by the drive levers;

(g) a pair of ratchet wheels fixed to the drive shaft of the bearing tube, one on each side of the supporting frame, with the ratchet wheels being disposed adjacent to the driven levers;

(h) a pair of spring-pressed pawls, each being carried by one of the driven levers and operatively engaging with an adjacent ratchet wheel to turn the drive shaft of the bearing tube and thereby propel the bicycle, or the like, through the instrumentality of the sprockets and chain, when the driven levers are swung in one direction by the drive levers;

(i) and each of the driven levers being provided with a stop that projects into the path of the adjacent foot rest to limit downward swinging movement of the latter.

References Cited by the Examiner

The following references, cited by the Examiner, are of record in the patented file of this patent or the original patent.

UNITED STATES PATENTS

| | | | |
|---|---|---|---|
| 418,963 | 1/90 | Stoner | 280—258 |
| 651,967 | 6/00 | Freize | 280—258 |

FOREIGN PATENTS

| | | |
|---|---|---|
| 96,135 | 1/20 | Germany. |
| 459,800 | 1/15 | Great Britain. |
| 444,863 | 2/49 | Italy. |

MILTON BUCHLER, *Primary Examiner.*

KENNETH H. BETTS, *Examiner.*